(12) United States Patent
Izumida et al.

(10) Patent No.: US 11,843,761 B2
(45) Date of Patent: Dec. 12, 2023

(54) DRAWING VERIFICATION SYSTEM, CLIENT APPARATUS, RECORDING MEDIUM, SERVER APPARATUS AND CONTROL METHOD

(71) Applicant: HIRATA CORPORATION, Kumamoto (JP)

(72) Inventors: Maasa Izumida, Kumamoto (JP); Yuji Nonaka, Kumamoto (JP); Yoko Osumi, Kumamoto (JP)

(73) Assignee: HIRATA CORPORATION, Kumamoto (JP)

( * ) Notice: Subject to any disclaimer, the term of this patent is extended or adjusted under 35 U.S.C. 154(b) by 232 days.

(21) Appl. No.: 17/477,911

(22) Filed: Sep. 17, 2021

(65) Prior Publication Data
US 2022/0007004 A1    Jan. 6, 2022

Related U.S. Application Data

(63) Continuation of application No. PCT/JP2019/014290, filed on Mar. 29, 2019.

(51) Int. Cl.
*H04N 13/275* (2018.01)
*H04L 67/14* (2022.01)
(Continued)

(52) U.S. Cl.
CPC ......... *H04N 13/275* (2018.05); *H04L 67/141* (2013.01)

(58) Field of Classification Search
CPC ....... G06T 19/00; G06T 17/05; G06T 3/0031; G05B 19/41885; G05B 19/41865;
(Continued)

(56) References Cited

U.S. PATENT DOCUMENTS 10,778,855 B2    9/2020  Lee
2004/0193428 A1   9/2004  Fruchter et al.
(Continued)

FOREIGN PATENT DOCUMENTS

CN    108881784 A      11/2018
CN    110709850 A  *   1/2020  ............. G06F 17/50
(Continued)

OTHER PUBLICATIONS

Li Min et al: "Real-Time Collaborative Design With Heterogeneous CAD Systems Based on Neutral Modelling Commands", Journal of Computing and Information Science in Engineering, vol. No. 2, Jun. 1, 2007, pp. 113-125 (Year: 2007).*
(Continued)

*Primary Examiner* — Wesner Sajous
(74) *Attorney, Agent, or Firm* — BUCHANAN INGERSOLL & ROONEY PC

(57) ABSTRACT

In a system, a server establishes a session for verification of drawing information and implements information communication between clients connected to the session. The verification in the session is performed by laying out rendering object information used to render an object of the drawing information in a virtual 3D space based on layout information. The system comprises: establishing, upon receiving a session start request from one of the clients storing a verification target drawing information, the session to which the client storing the drawing information is able to connect; managing state information indicating a state of the 3D space for the session; receiving information of a verification input made at the clients; changing the state information upon receiving the verification input; and transmitting, to the connected clients, shared information necessary to render the 3D space.

17 Claims, 4 Drawing Sheets

(51) Int. Cl.
*G06T 19/00* (2011.01)
*G06T 17/05* (2011.01)
*G05B 19/41* (2006.01)
*G06F 30/10* (2020.01)
*G06Q 10/10* (2023.01)
*G06Q 10/06* (2023.01)
*H04L 67/141* (2022.01)

(58) Field of Classification Search
CPC .......... G05B 19/4097; G05B 19/40938; G06F 30/10; G06F 2111/02; G06Q 10/103; G06Q 10/06; G06Q 10/063; G06Q 50/04; Y02P 90/30; H04N 13/275; H04N 13/279; H04N 13/117; H04L 67/141; H04L 67/12
See application file for complete search history.

(56) References Cited

U.S. PATENT DOCUMENTS

| | | | |
|---|---|---|---|
| 2012/0194548 A1 | 8/2012 | Ahn | |
| 2016/0373493 A1 | 12/2016 | Lee | |
| 2018/0349519 A1* | 12/2018 | Schroeder | G16H 50/50 |
| 2020/0380177 A1* | 12/2020 | Schroeder | G16H 50/50 |
| 2022/0270049 A1* | 8/2022 | Patel | G06Q 30/0641 |
| 2022/0342400 A1* | 10/2022 | Rudnitsky | G05B 19/4097 |

FOREIGN PATENT DOCUMENTS

| | | | | |
|---|---|---|---|---|
| JP | H1091057 A | 4/1998 | | |
| JP | 2000215230 A | 8/2000 | | |
| JP | 2001022958 A | 1/2001 | | |
| JP | 2001195438 A | 7/2001 | | |
| JP | 2008003935 A | 1/2008 | | |
| JP | 2018106297 A | 7/2018 | | |
| KR | 101833581 B1 * | 2/2018 | ......... | G06F 17/5004 |
| KR | 102027856 B1 * | 11/2019 | ........... | G06F 3/0346 |
| TW | 201701177 A | 1/2017 | | |
| WO | 2012137567 A1 | 10/2012 | | |

OTHER PUBLICATIONS

Witzerman, James Phillip, "A facility description language for distributed design integration", 1995, ProQuest Dissertations Publishing (Year: 1995).*

International Preliminary Examination Report (PCT/IPEA/409) dated Mar. 16, 2021, by the Japan Patent Office for International Application No. PCT/JP2019/014290.

International Search Report (PCT/ISA/210) with English translation and Written Opinion (PCT/ISA/237) dated Jun. 25, 2019, by the Japan Patent Office as the International Searching Authority for International Application No. PCT/JP2019/014290.

Office Action dated Sep. 16, 2022, in corresponding Taiwanese Patent Application No. 109107931 and English translation of the Office Action. (16 pages).

Extended European Search Report dated Jul. 22, 2022, issued in corresponding European Application No. 19923066.5. (13 pages).

Kan et al., "An Internet Virtual Reality Collaborative Environment for Effective Product Design", Computers in Industry, Elsevier, Amsterdam, NL, Jun. 1, 2001, vol. 45, No. 2, pp. 197-213, XP004245269.

Li et al., "Real-Time Collaborative Design With Heterogeneous CAD Systems Based on Neutral Modeling Commands", Journal of Computing and Information Science in Engineering, Jun. 1, 2007, vol. 7, No. 2, pp. 113-125, XP055941667.

Shen et al., "A Framework for Multiple-View Product Representation Using Augmented Reality", Cyberworlds, 2006. CW '06. International Conference On, IEEE, PI, Nov. 1, 2006, pp. 157-164, XP031030572.

Shen et al., "Augmented Reality for Collaborative Product Design and Development", Design Studies, Design Research Society, XX, Mar. 1, 2010, vol. 31, No. 2, pp. 118-145, XP026937538.

Chunlong et al., "Research on Multiuser Oriented 3D Virtual Workshop Scene Sharing Technology", Journal of Military Engineering, May 2002, vol. 23, No. 2. (12 pages).

Office Action dated Jun. 7, 2023, in corresponding Chinese Patent Application No. 201980094584.4 and English translation of the Office Action. (15 pages).

* cited by examiner

DRAWING VERIFICATION SYSTEM, CLIENT APPARATUS, RECORDING MEDIUM, SERVER APPARATUS AND CONTROL METHOD

CROSS-REFERENCE TO RELATED APPLICATION(S)

This application claims priority to and the benefit of International Application No. PCT/JP2019/014290 filed on Mar. 29, 2019, the entire disclosure of which is incorporated herein by reference.

BACKGROUND OF THE INVENTION

Field of the Invention

The present invention relates to a drawing verification system, a client apparatus, and a recording medium and, more particularly, to a technique of implementing verification of drawing information designed based on facility specifications by using presentation of views of binocular stereoscopic vision.

Description of the Related Art

When newly introducing a facility machine to be installed in a factory or establishing a new factory in which a facility machine is introduced, a facility specification document is created in advance in consideration of a product to be made using the facility machine, an installation place in the production factory, and the like, and an order is placed with the manufacturing company of the facility machine. The manufacturing company creates design drawings including the facility machine and its layout so as to satisfy requested specifications based on the facility specification document of the production facility and the like.

The design drawings of the production facility are created as electronic data (drawing data: drawing information) using a design tool such as CAD, and shared with the orderer. Based on the drawing data, the orderer and the manufacturing company verify whether, for example, the requested facility specifications are satisfied. To perform such verification more constructively, there is recently proposed a system that changes drawing information while the orderer and the manufacturing company communicate with each other in real time via a network (Japanese Patent Laid-Open No. 2001-195438).

The above-described verification referring to drawing data is performed before construction regarding introduction of a facility machine. Particularly when, for example, drawing data are 2D design drawings, it is difficult for a person unfamiliar with design drawings to grasp the layout of a plurality of facility machines, traffic lines, and the like. This problem may be slightly solved if the orderer could directly visit a production facility to be introduced. However, for example, considering the fact that an order is placed and received across countries, this requires costs such as the cost and time of travel and is not practical.

The present invention has been made to solve the above-described problems, and provides a drawing verification system, a client apparatus, a recording medium, a server apparatus and a control method for preferably implementing verification of drawing information composed based on facility specifications.

SUMMARY OF THE INVENTION

The present invention in its first aspect provides a drawing verification system comprising a server apparatus that establishes a session pertaining to verification of drawing information composed based on a facility specification, and a plurality of client apparatuses that connect to the session via a network and perform information communication, wherein the verification in the session is performed by laying out rendering object information used to render an object included in the drawing information in a virtual 3D space based on layout information that corresponds to the drawing information and indicates a position and posture of the object, the server apparatus comprises: an establishing unit configured to establish the session upon receiving a session start request from one of the plurality of client apparatuses storing the drawing information that is a verification target; a management unit configured to manage state information indicating a state of the 3D space that is corresponding to the verification target drawing information for the session which is established by the establishing unit; a first reception unit configured to receive information of a verification input made at each of the plurality of client apparatuses participating in the session; a change unit configured to change the state information upon receiving the information of the verification input by the first reception unit; and a first transmission unit configured to transmit, to the client apparatuses connected to the session, shared information necessary to render the 3D space based on the state information, and each of the plurality of client apparatuses comprises: a first recording unit; a second reception unit configured to connect, on a condition that the verification target drawing information is stored in the first recording unit, to the session and receive the shared information transmitted by the first transmission unit; a construction unit configured to construct at least part of the 3D space based on the shared information received by the second reception unit, the rendering object information, and the layout information; a decision unit configured to decide a position and direction of a viewpoint at which the constructed 3D space is rendered; an output unit configured to sequentially render and output views of binocular stereoscopic vision of the constructed 3D space rendered based on the viewpoint decided by the decision unit; a presentation unit configured to present the views of binocular stereoscopic vision rendered and output by the output unit; an input unit configured to accept the verification input; and a second transmission unit configured to transmit, to the server apparatus, the information of the verification input accepted by the input unit.

The present invention in its second aspect provides a client apparatus that connects and performs information communication via a network to a session, which is established by a server apparatus for verification of drawing information designed based on a facility specification and to which a plurality of client apparatuses are able to connect, wherein the verification in the session is performed by laying out rendering object information used to render an object included in the drawing information in a virtual 3D space based on layout information that corresponds to the drawing information and indicates a position and posture of the object, the client apparatus comprises: a recording unit; a connection unit configured to connect, on a condition that the drawing information which is a verification target is stored in the recording unit, to the session; a reception unit configured to receive shared information necessary to render the 3D space in which verification is performed in the session; a construction unit configured to construct at least part of the 3D space based on the shared information received by the reception unit, the rendering object information, and the layout information; a decision unit configured to decide a position and direction of a viewpoint at which the constructed 3D space is rendered; an output unit configured to sequentially render and output views of binocular stereoscopic vision of the constructed 3D space rendered based on the viewpoint decided by the decision unit; a presentation unit configured to present the views of binocular stereoscopic vision rendered and output by the output unit; an input unit configured to accept a verification input; and a transmission unit configured to transmit information of the verification input accepted by the input unit.

The present invention in its third aspect provides a non-transitory computer-readable recording medium that records a program for causing a computer to function as each unit of the client apparatus according to the second aspect.

The present invention in its fourth aspect provides a server apparatus that establishes a session pertaining to verification of drawing information composed based on a facility specification and implements information communication between a plurality of client apparatuses connected to the session via a network, wherein the verification in the session is performed by laying out rendering object information used to render an object included in the drawing information in a virtual 3D space based on layout information that corresponds to the drawing information and indicates a position and posture of the object, the server apparatus comprises: a management unit configured to manage state information indicating a state of the 3D space that is a verification target for the session, which is established upon receiving a session start request from one of the plurality of client apparatuses; a reception unit configured to receive information of a verification input made at each of the plurality of client apparatuses participating in the session; a change unit configured to change the state information upon receiving the information of the verification input by the reception unit; and a transmission unit configured to transmit, to the client apparatuses connected to the session, shared information necessary to render the 3D space based on the state information, wherein the verification includes at least one of a change instruction of an object laid out in the 3D space, a change instruction of at least one of a position and posture of an object laid out in the 3D space, and discussion information indicating contents of a discussion conducted for verification of the drawing information, and the management unit manages, by including in the state information based on a change of the state information according to the information of the verification input by the change unit, history information indicating at least one of a change history of the object laid out in the 3D space, a change history of at least one of the position and posture of the object laid out in the 3D space, and a minute generated based on the discussion information.

The present invention in its fifth aspect provides a server apparatus that establishes a session pertaining to verification of drawing information composed based on a facility specification and implements information communication between a plurality of client apparatuses connected to the session via a network, wherein the verification in the session is performed by laying out rendering object information used to render an object included in the drawing information in a virtual 3D space based on layout information that corresponds to the drawing information and indicates a position and posture of the object, the drawing information includes at least the rendering object information and the layout information corresponding to the drawing information, and the server apparatus comprises: a management unit configured to manage state information indicating a state of the 3D space that is a verification target for the session, which is established upon receiving a session start request from one of the plurality of client apparatuses; a reception unit configured to receive information of a verification input made at each of the plurality of client apparatuses participating in the session; a change unit configured to change the state information upon receiving the information of the verification input by the reception unit; a transmission unit configured to transmit, to the client apparatuses connected to the session, shared information necessary to render the 3D space based on the state information; an update unit configured to update the drawing information based on the information of the verification input received by the reception unit; and an adjustment unit configured to perform, when the same changes for the same object are made by more than a predetermined number of times, at least one of changing the layout information and proposing a change in a session for verifying the drawing information that adopts the layout information.

The present invention in its sixth aspect provides a server apparatus that establishes a session pertaining to verification of drawing information composed based on a facility specification and implements information communication between a plurality of client apparatuses connected to the session via a network, wherein the verification in the session is performed by laying out rendering object information used to render an object included in the drawing information in a virtual 3D space based on layout information that corresponds to the drawing information and indicates a position and posture of the object, and the server apparatus comprises: an establishing unit configured to establish, upon receiving a session start request from one of the plurality of client apparatuses storing the drawing information that is a verification target, the session to which the client apparatus storing the drawing information is able to connect; a management unit configured to manage state information indicating a state of the 3D space that is corresponding to the verification target drawing information for the session which is established by the establishing unit; a reception unit configured to receive information of a verification input made at each of the plurality of client apparatuses participating in the session; a change unit configured to change the state information upon receiving the information of the verification input by the reception unit; and a transmission unit configured to transmit, to the client apparatuses connected to the session, shared information necessary to render the 3D space based on the state information.

The present invention in its seventh aspect provides a control method of a server apparatus that establishes a session pertaining to verification of drawing information composed based on a facility specification and implements information communication between a plurality of client apparatuses connected to the session via a network, wherein the verification in the session is performed by laying out rendering object information used to render an object included in the drawing information in a virtual 3D space based on layout information that corresponds to the drawing information and indicates a position and posture of the object, and the control method comprises: establishing, upon receiving a session start request from one of the plurality of client apparatuses storing the drawing information that is a verification target, the session to which the client apparatus storing the drawing information is able to connect; managing state information indicating a state of the 3D space that is corresponding to the verification target drawing information for the session which is established in the establishing; receiving information of a verification input made at each of the plurality of client apparatuses participating in the session; changing the state information upon receiving the information of the verification input in the reception; and transmitting, to the client apparatuses connected to the session, shared information necessary to render the 3D space based on the state information.

The present invention in its eighth aspect provides a non-transitory computer-readable recording medium that records a program for causing a computer to function as each unit of the server apparatus according to the sixth aspect.

The present invention in its ninth aspect provides a non-transitory computer-readable recording medium that records a drawing information which is designed based on a facility specification and is used in a client apparatus comprising the recording medium, wherein the client apparatus connects and performs information communication via a network to a session, which is established by a server apparatus for verification of the drawing information and to which a plurality of the client apparatuses are able to connect, the verification in the session is performed by laying out rendering object information used to render an object included in the drawing information in a virtual 3D space based on layout information that corresponds to the drawing information and indicates a position and posture of the object, the drawing information is information used for a request from the client apparatus to start the session and for a participation of the client apparatus in the session established and started by the server apparatus based on the request to start the session, and the drawing information includes the rendering object information, the layout information and authority information indicating whether to permit the request to start the session and the participation in the session.

Further features of the present invention will become apparent from the following description of exemplary embodiments (with reference to the attached drawings).

DESCRIPTION OF THE EMBODIMENTS

First Embodiment

Figure 1:
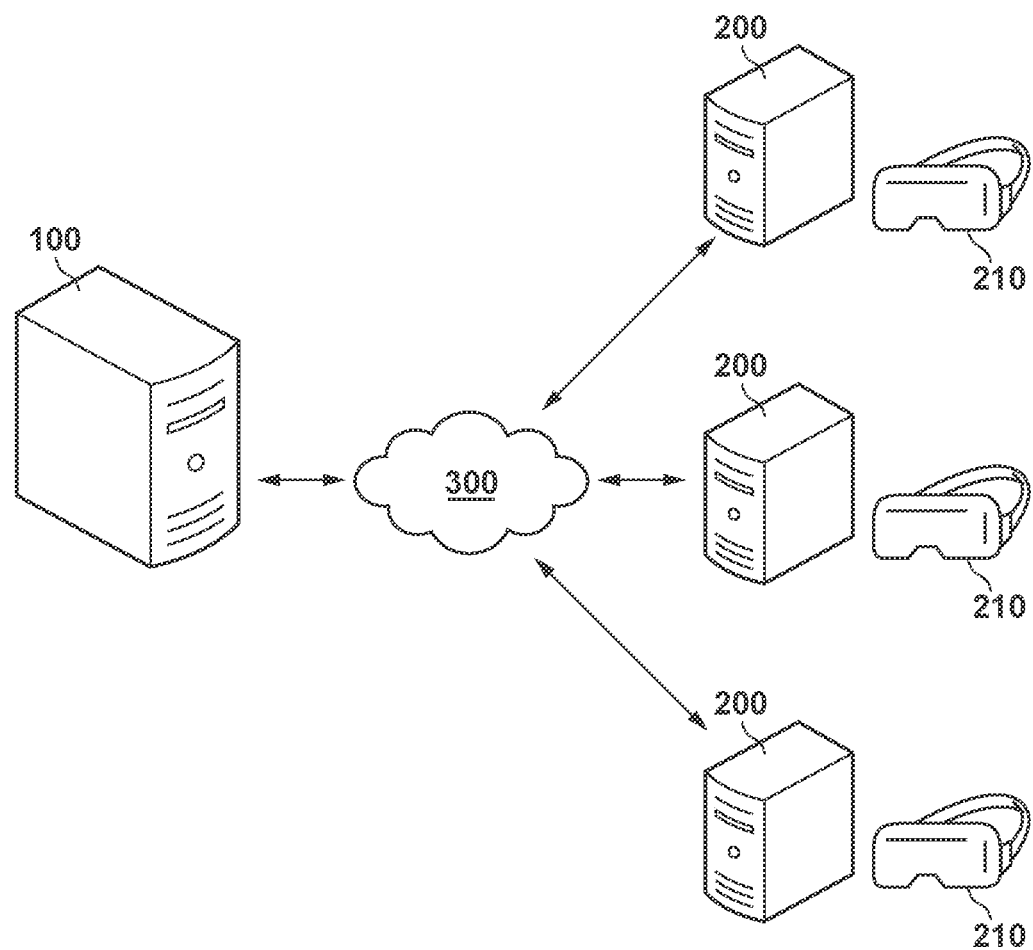
FIG. 1 is a view showing the arrangement of a drawing verification system according to embodiments and modifications of the present invention.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

The following embodiment will explain an example in which the present invention is applied to, as an example of a drawing verification system, a drawing verification system including a server apparatus that establishes a session pertaining to verification of drawing information composed based on facility specifications, and a plurality of client apparatuses that connect to the session via a network and perform information communication. However, the present invention is applicable to a system constituted by arbitrary devices that provide a function pertaining to verification of drawing information to a plurality of communication-connected devices.

<<Arrangement of Drawing Verification System>>

FIG. 1 is a view showing the arrangement of the drawing verification system according to the embodiment of the present invention.

As shown in FIG. 1, the drawing verification system is constituted so that a plurality of client apparatuses 200 can be connected to a server apparatus 100 via a network 300. In the embodiment, when the server apparatus 100 receives a session start request from an arbitrary client apparatus 200, it establishes a session in which the plurality of client apparatuses 200 can participate, and implement transmission/reception of information between the client apparatuses 200 participating in the session. As will be described later in detail, the server apparatus 100 receives information from any one of the client apparatuses 200 during the session, performs predetermined processing, and if necessary, transmits the information after the processing to the other client apparatuses 200 participating in the session. The server apparatus 100 can implement information communication and information synchronization between the participating client apparatuses 200 and share the same information.

A session established in the drawing verification system according to the embodiment is a verification session in which drawing information composed (created) based on predetermined facility specifications so as to satisfy the facility specifications is verified. The drawing information is, for example, drawing data composed (created) for a target establishment to include at least information of a facility machine to be installed and information of the layout of the facility machine in the establishment. In the verification session, the user of each client apparatus 200 can visually observe, in the form of binocular stereoscopic vision, a virtual 3D space simulating the establishment indicated by the drawing information. As an apparatus that implements information presentation by binocular stereoscopic vision, a HMD (Head-Mounted Display) 210 is connected to each client apparatus 200.

When the plurality of client apparatuses 200 participate in the verification session, verification is possible between the client apparatuses 200 using drawing information copied based on the same drawing information. At this time, a 3D space pertaining to the drawing information can be visually checked from independent viewpoints in the respective participating client apparatuses 200, implementing simultaneous verification by a plurality of users. In the verification in which the plurality of client apparatuses 200 participate, for example, even speech communication may be possible.

To enable such verification, the client apparatus 200 in the drawing verification system according to the embodiment holds drawing information pertaining to a facility to be verified. The drawing information is composed of rendering object information that may be 3D CAD data pertaining to a facility machine to be installed in a target establishment or 3D model data obtained by converting the 3D CAD data, layout information indicating the layout of each facility machine to be installed, and authority information such as the authority to permit participation in a verification session or the authority necessary for participation. That is, the client apparatus 200 can issue a session start request and participate in the verification session based on the premise that it holds drawing information including authority information indicating that participation is permitted. The authority information necessary for the session start request and participation in the verification session is availably prepared or provided together with drawing information via, for example, a telecommunication line or a portable recording medium such as a USB memory, CD-R, or DVD-R, and is recorded on a recording medium 202 of the client apparatus 200.

In the client apparatus 200 participating in the verification session, a 3D space pertaining to drawing information is rendered from a viewpoint corresponding to each eyeball in a view of binocular stereoscopic vision, in order to present the 3D space. More specifically, at least part of the 3D space corresponding to the drawing information is constructed by laying out 3D model data pertaining to rendering object information included in the drawing information in the 3D space based on the layout information. The constructed 3D space is rendered based on a separately decided position and direction of the viewpoint for each eyeball, thereby generating images that are presented using the HMD 210 and implement binocular stereoscopic vision.

The 3D model data pertaining to rendering object information is provided for each facility machine. When the rendering object information is 3D CAD data, the 3D model data may be generated by converting the 3D CAD data in the client apparatus 200. The 3D CAD data is data of a large information amount such as a large number of vertices because a fine shape definition is made in accordance with its application purpose and all parts constituting a facility machine are separable. When rendering a 3D space in which a plurality of facility machines are laid out, 3D CAD data requires an enormous calculation amount of rendering processing and a long processing time, and is not practical because the 3D CAD data excessively includes planes that need not be rendered and parts that cannot be seen externally, and has a large number of vertices of planes to be rendered. Hence, the 3D CAD data undergoes conversion processing such as removal of parts that do not influence the expression of the outer appearance, thinning of the number of vertices, change of cohesion information, replacement with a simple stereoscopic shape, and reduction of the numbers of parts and vertices by integration of a plurality of parts. As a result, simplified 3D model data is obtained and used for rendering processing.

Note that the rendering object information is not limited to 3D CAD data or 3D model data, and may include various texture data applied to the 3D model data, motion information that defines a motion of at least some parts during operation, and the like. The rendering object information may include a rendering program such as a shader applied to 3D model data, and designation information of calculation data used in the rendering program such as the light source type, light source intensity, and light source vector. The layout information may include information of a light source installed in an establishment.

The server apparatus 100 manages information of a 3D space pertaining to drawing information in order to synchronize verification contents between the client apparatuses 200 participating in a verification session. In the embodiment, the client apparatus 200 renders a 3D space pertaining to drawing information, and the server apparatus 100 manages only information pertaining to synchronization of verification. The server apparatus 100 only needs to hold at least layout information out of the drawing information prior to the start of the verification session.

The server apparatus 100 manages state information indicating the state of the 3D space pertaining to the drawing information during the verification session, and sequentially updates the state information based on operations (verification inputs) performed for verification in the client apparatuses 200. Information (shared information) about the change that occurred in the state information is transmitted to the client apparatuses 200 participating in the verification session, and is reflected in 3D spaces being constructed in the client apparatuses 200. Therefore, all the participating client apparatuses 200 implement the appreciation of the rendering object information in which the pieces of drawing information saved in the client apparatuses 200 are synchronized based on the 3D spaces in similar states.

<Arrangement of Server Apparatus>

Figure 2:
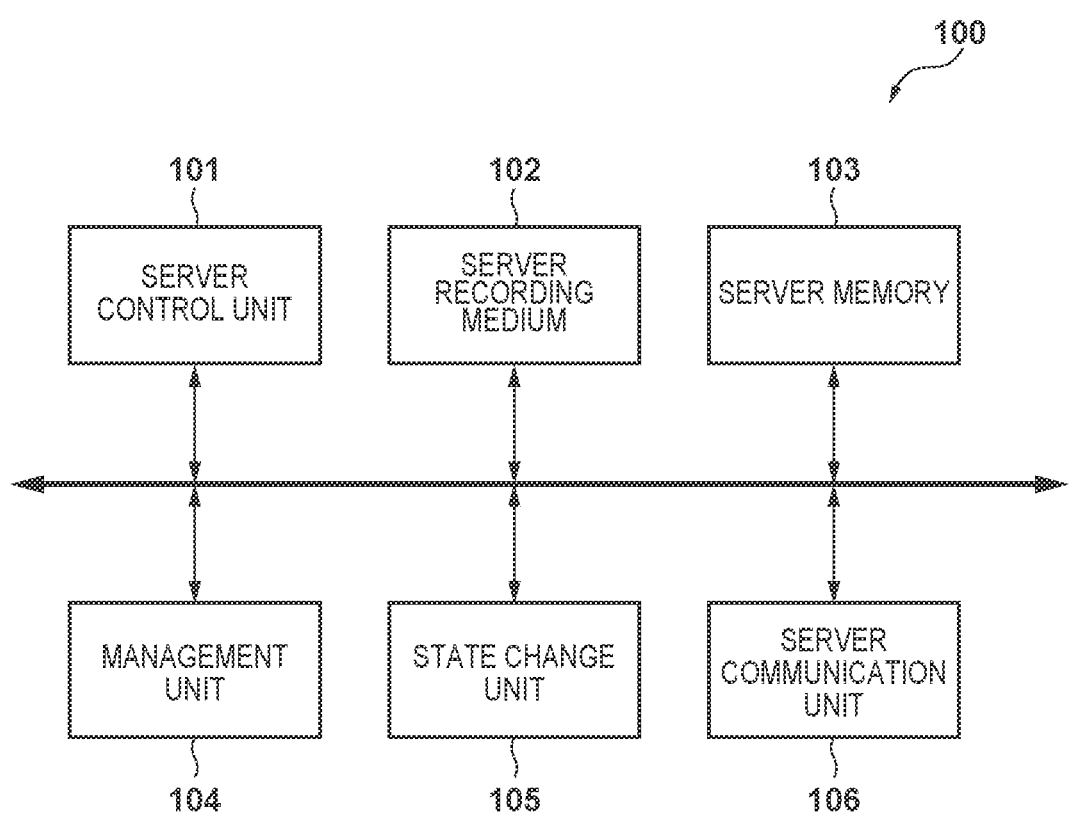
FIG. 2 is a block diagram showing the functional arrangement of a server apparatus 100 according to the embodiments and modifications of the present invention.

Next, the functional arrangement of the server apparatus 100 according to the embodiment will be described in detail with reference to the block diagram of FIG. 2. In the following description, constituent elements that implement similar functions in the server apparatus 100 and the client apparatus 200 will be discriminated by adding a prefix "server" to the constituent elements of the server apparatus 100.

A server control unit 101 is, for example, a CPU and controls the operation of each block of the server apparatus 100. More specifically, the server control unit 101 controls the operation of each block by, for example, reading out the operation program of each block or a program pertaining to provision of a verification session that is recorded on a server recording medium 102, deploying it in a server memory 103, and executing it.

The server recording medium 102 is a recording device such as a nonvolatile memory or HDD that can permanently hold data. The server recording medium 102 records parameters and the like necessary for the operation of each block, in addition to the operation program of each block of the server apparatus 100 and the program pertaining to provision of a verification session. The server memory 103 is a storage device such as a volatile memory that is used to temporarily store data. The server memory 103 is used as the deploying area of each program and also as a storage area for temporarily storing data and the like output in the operation of each block.

For a verification session during establishment and a terminated verification session, a management unit 104 manages the state information of a 3D space pertaining to corresponding drawing information. Details of the state information will be described later. The management unit 104 manages information obtained by sequentially adding changes based on information of verification inputs during the verification session to initial state information composed based on drawing information-based layout information. When there is a change in the state information under management, the management unit 104 generates shared information in order to synchronize 3D spaces pertaining to drawing information constructed in the respective client apparatuses 200.

In a verification session, a state change unit 105 changes state information managed by the management unit 104 based on information of a verification input to the participating client apparatus 200.

A server communication unit 106 is a communication interface of the server apparatus 100 for communicating with another apparatus. The server communication unit 106 connects to an external device via the network 300 by a predetermined wired or wireless communication method, and transmits/receives data.

<Arrangement of Client Apparatus>

Figure 3:
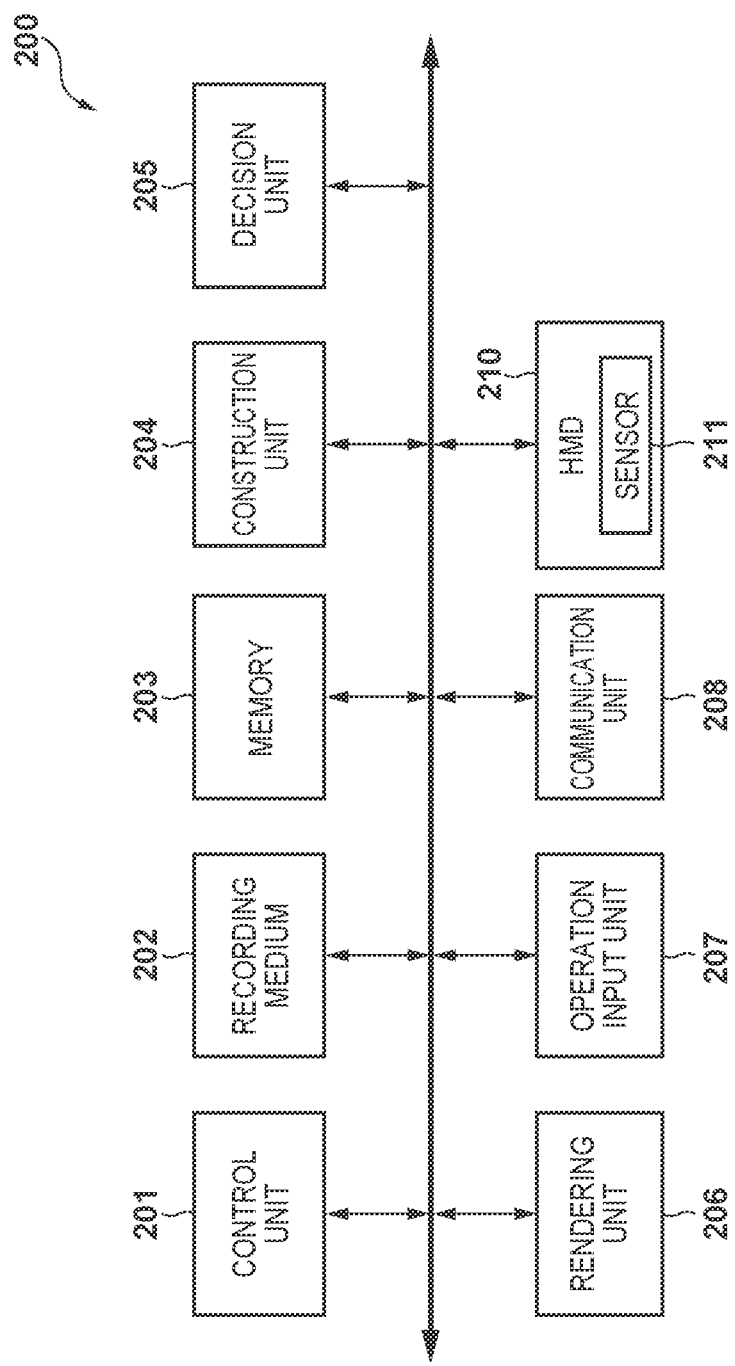
FIG. 3 is a block diagram showing the functional arrangement of a client apparatus 200 according to the embodiments and modifications of the present invention.

Next, the functional arrangement of the client apparatus 200 according to the embodiment will be described in detail with reference to the block diagram of FIG. 3.

A control unit 201 is, for example, a CPU and controls the operation of each block of the client apparatus 200. More specifically, the control unit 201 controls the operation of each block by, for example, reading out the operation program of each block or a program pertaining to participation in a verification session that is recoded on a recording medium 202, deploying it in a memory 203, and executing it.

The recording medium 202 is a recording device such as a nonvolatile memory or HDD that can permanently hold data. The recording medium 202 records parameters and the like necessary for the operation of each block, in addition to the operation program of each block of the client apparatus 200 and the program pertaining to participation in a verification session. The memory 203 is a storage device such as a volatile memory that is used to temporarily store data. The memory 203 is used as the deploying area of each program and also as a storage area for temporarily storing data and the like output in the operation of each block.

A construction unit 204 constructs a 3D space pertaining to rendering drawing information during participation in a verification session. The 3D space constructed by the construction unit 204 need not include the entire 3D space indicated by the drawing information, and suffices to be a state in which at least rendering objects falling within the visual field range of a viewpoint, at which rendering is performed, are laid out. More specifically, the construction unit 204 specifies, based on information of a set viewpoint position, predetermined objects (for example, facility machine and illumination) that are defined by layout information to be laid out in a construction range corresponding to the viewpoint. Then, the construction unit 204 deploys rendering object information pertaining to the specified objects in, for example, the memory 203, and lays out the objects in a virtual 3D space based on the layout information, thereby constructing at least part of the 3D space managed in the server apparatus 100.

As described above, in the drawing verification system according to the embodiment, the state of a 3D space changes based on verification inputs to the respective client apparatuses 200 participating in a verification session. For this reason, the construction unit 204 is assumed to construct a 3D space while also reflecting shared information received when the state of the 3D space changes in the server apparatus 100. The 3D space is constructed in each client apparatus 200 in accordance with its viewpoint direction.

Although the construction unit 204 constructs a 3D space in the embodiment, the practice of the present invention is not limited to this. A 3D space may be constructed by a rendering unit 206 (to be described later) or implemented by another arrangement.

A decision unit 205 decides the position and direction of a viewpoint at which rendering is performed for a constructed 3D space. In the embodiment, the appreciation of a 3D space in a verification session is performed using views of binocular stereoscopic vision, so the decision unit 205 decides positions and directions for the respective left- and right-eye viewpoints. The position and direction of the viewpoint may be decided in accordance with, for example, at least either of detection of an operation input pertaining to the movement (change of at least either translation or rotation) of the viewpoint and detection of the movement (translation and rotation in a real space) of the head of a user wearing the HMD 210. At this time, the decision unit 205 decides the positions and directions of the left- and right-eye viewpoints by reflecting the detected movement with respect to an intermediate point between the two viewpoints, and shifting the viewpoints each by half the interocular distance in the baseline length direction.

The rendering unit 206 is, for example, a rendering device such as a GPU. The rendering unit 206 renders a 3D space constructed pertaining to drawing information based on the viewpoints decided by the decision unit 205, and generates images pertaining to one frame of a view for binocular stereoscopic vision. The images of one frame generated by the rendering unit 206 are sequentially output to the HMD 210 (to be described later) and presented.

An operation input unit 207 is, for example, a user interface of the client apparatus 200, such as a controller, a mouse, or a keyboard provided for a verification input in a verification session. When the operation input unit 207 detects an operation input from the user, it transmits a control signal corresponding to the operation input to the control unit 201. In the embodiment, the viewpoint is changed in accordance with the position of the head of the user of the client apparatus 200 who wears the HMD 210. The operation input unit 207 detects a sensor output from a sensor 211 of the HMD 210 or information obtained by converting the sensor output into a predetermined format.

A communication unit 208 is a communication interface of the client apparatus 200 for communicating with another apparatus. The communication unit 208 connects to an external device via the network 300 by a predetermined wired or wireless communication method, and transmits/receives data.

The HMD 210 is a display device that presents a view of binocular stereoscopic vision pertaining to verification of drawing information in a verification session according to the embodiment. Although the HMD 210 is used as a display device that presents a view of binocular stereoscopic vision in the embodiment, the practice of the present invention is not limited to this, and the HMD 210 can be any device capable of presenting information by binocular stereoscopic vision. In the embodiment, the HMD 210 includes the sensor 211 that can be an acceleration sensor or a gyro sensor, and can detect the movement of the head of the user (wearing the HMD 210) during the presentation of a view pertaining to a verification session. However, the practice of the present invention is not limited to this, and the movement of the head of the user may be derived by detecting a marker provided on the HMD 210 by an externally provided detection device such as an image sensor and analyzing the marker.

<<Verification Session>>

Functions provided in a verification session and an operation mode in the drawing verification system having the above-described arrangement according to the embodiment will be described below.

In a verification session, functions pertaining to various verifications and adjustments including a change of the layout of a facility machine in a 3D space pertaining to common drawing information and a change to another facility machine are provided for the drawing information to the client apparatuses 200 connected to the session. In the embodiment, the state of the 3D space pertaining to the drawing information is temporarily changed by the functions and shared between the client apparatuses 200 connected to the verification session.

The user of each client apparatus 200 participating in the verification session is laid out as an avatar in the 3D space and represented as a rendering object visible from the viewpoint of another client apparatus 200. The position and posture of at least the head of the avatar in the 3D space are configured to be synchronized with a viewpoint at which binocular stereoscopic vision is provided in the client apparatus 200 corresponding to the avatar. In providing the functions pertaining to verification and adjustment, this configuration implements a smooth communication between users such that a portion receiving attention from each user or a rendering object subjected to discussion can be easily grasped.

The behavior of each avatar is controlled by transmitting, to the server apparatus 100, viewpoint information indicating a viewpoint set in the client apparatus 200, changing, by the state change unit 105 based on the viewpoint information, the state of a corresponding avatar out of state information managed by the management unit 104, and transmitting the contents of the change as shared information to each client apparatus 200. In the client apparatus 200 that has received the shared information, the construction unit 204 constructs (changes) a 3D space in which the position and posture of a corresponding avatar are changed and the avatar is laid out so as to achieve a state indicated by the shared information, and the rendering unit 206 renders the 3D space. By this information sharing, the state of a verification performed in the client apparatus 200 participating in the verification session is presented to even the other client apparatuses 200.

In the verification session according to the embodiment, a function of indicating and selecting a rendering object or an arbitrary portion of the rendering object laid out in a 3D space is provided in each client apparatus 200. The presentation mode of the indicated/selected target is controlled so that the target can be identified. Even a change of the presentation mode is shared as shared information, similar to the avatar, and can be presented in all the client apparatuses 200 participating in the verification session. This function can more easily notify the other client apparatuses 200 of a status of the verification. The presentation mode in which a indicated/selected target can be identified may be, for example, a mode in which the rendering color of the target is changed (including a change of the color, increase in color tone, or emission of light), a mode in which a predetermined index object such as a pointer is arranged near, or a mode in which the target is indicated using the hand of the avatar or the like.

In the drawing verification system according to the embodiment, drawing information subjected to verification is used to verify an establishment in a state in which facility machines are laid out based on facility specifications. The drawing verification system provides the user of the client apparatus 200 via a view of binocular stereoscopic vision with an appreciation experience as if he/she performed a verification in the establishment. In other words, the rendering objects of the establishment and laid-out facility machines in the view of binocular stereoscopic vision presented to the user via the HMD 210 are appreciated in an actual size, that is, the same size as that in the real world. More specifically, the drawing verification system according to the embodiment is configured to adjust at least either of the camera parameter (angle of view) of rendering in each client apparatus 200 and the scaling of 3D model data of a rendering object so that the object in the real world is presented to the field of view of the user in the same size as that when viewed from a positional relationship corresponding to the viewpoint.

<Verification Input>

Next, a verification input indicating an input of changing the state of a 3D space pertaining to drawing information in the client apparatus 200 participating in such a verification session will be explained.

The verification input includes an operation input for instructing a change of an object laid out in an establishment defined by drawing information into another object. The operation input includes, for example, selection of an object laid out in a 3D space and selection of an object to be laid out instead of the selected object from an object list. Here, an object is not limited to a mode in which one whole facility machine is changed and may include, for example, a mode in which some assemblies of a facility machine are changed to other compatible assemblies. Alternatively, the verification input may be an operation input for instructing the layout of a new object in a region where no object is laid out.

The verification input includes an operation input for instructing a change of at least either the position or posture of an object laid out in an establishment defined by drawing information. The operation input includes, for example, selection of an object laid out in a 3D space and instruction of a position or posture of the object after change. The change may include a change of an interior element of the establishment such as a change of the height of the floor surface on which an object is laid out, or a change of the shape of the wall surface.

The verification input includes information (discussion information) of each input (text or speech) pertaining to a discussion between users performed in a verification session, such as a text chat or speech communication for an object laid out in an establishment defined by drawing information or an interior element of the establishment. In other words, the verification input (discussion information) in this mode is equivalent to a log of contents of a discussion performed while appreciating a 3D space pertaining to drawing information. The verification input may include, for example, an evaluation of facility specifications pertaining to drawing information, and the contents of exchange of opinions about a change of the state of the 3D space based on the verification input pertaining to the change.

In addition, an avatar corresponding to each client apparatus 200 is also an element that is laid out in a 3D space and managed in a verification session though the avatar is not directly indicated by drawing information. The verification input includes rendering viewpoint information (or an input pertaining to a change of the viewpoint) decided based on an input (operation input of directly changing the viewpoint or a sensing output from the sensor 211) pertaining to a change of the viewpoint in the corresponding client apparatus 200, and information indicating a status of a verification target indication/selection.

Information of a verification input to each client apparatus 200 is associated with identification information for identifying the client apparatus 200 (or its user) and then transmitted to the server apparatus 100. That is, the verification input information is transmitted to the server apparatus 100 in a state in which the client apparatus 200 that has accepted the input can be identified.

<Management of State Information>

When the server apparatus 100 receives the transmitted verification input information, the state change unit 105 changes state information pertaining to the verification session that is managed by the management unit 104. As for the verification input information other than discussion information, it is controlled to change the state of the rendering object of a facility machine or avatar laid out in a 3D space into a state instructed by the information. As for verification input information of discussion information, it is controlled to lay out and present, for example, at a corresponding position in a 3D space, an object displaying discussion contents in the list form so that the object can be confirmed.

In the drawing verification system according to the embodiment, the server apparatus 100 manages only the state of a 3D space for drawing information subjected to verification in a verification session, and does not change the drawing information. That is, state information is changed, but the change is not reflected in drawing information and is merely a temporal change performed to verify drawing information. This verification is performed to check whether currently composed drawing information preferably satisfies facility specifications, whether a trouble (for example, interference) occurs when an establishment is constructed based on the drawing information, or whether there is room for improvement after performing a verification.

In the drawing verification system according to the embodiment, as for a verification session performed for one drawing information, state information includes history information indicating a history of changes or the like performed based on verification inputs. The history information is managed in association with information for identifying the drawing information so that changes of the drawing information based on the verification and items to be verified can be checked after the end of the session.

As described above, in the drawing verification system according to the embodiment, the history information includes at least one of the change history of an object, the change history of the position and direction of an object, and the minutes based on discussion information. The history information is composed so that changes, remarks, and the like caused by verification inputs to the client apparatuses 200 can be referred to in time-series. When changing the drawing information based on this information, the destination to confirm the contents of a change can be specified, and the locus of responsibility pertaining to the change can be clarified.

The history information is not limited to a mode in which the history of changes to state information corresponding to drawing information is managed in every verification session. For example, history information composed for a terminated verification session may be composed so that a verification can be performed while switching reflection/non-reflection in state information for every history when performing a verification session again based on the same drawing information.

<Shared Information>

When state information managed by the management unit 104 is changed based on verification input information, the server apparatus 100 transmits shared information to each client apparatus 200 so that the construction unit 204 of the client apparatus 200 connected to a verification session reflects the change in a 3D space constructed for rendering. The shared information need not indicate all changes from initial state information managed based on layout information of drawing information, and suffices to indicate a difference from state information of an immediately preceding state at the change timing of each state information. The construction unit 204 of each client apparatus 200 can update the 3D space that has already constructed based on the received shared information, thereby constructing a local 3D space while reflecting the change that occurred based on the verification input by the client apparatus 200 connected to the verification session. As a result, the verification can be performed while pieces of drawing information saved in the respective client apparatuses 200 are synchronized based on 3D spaces synchronized between the client apparatuses 200 connected to the verification session.

At the time of establishing a verification session, state information is based on only layout information of drawing information, and no shared information need be transmitted. When the client apparatuses 200 participate in the verification session and perform a verification, the states of avatars pertaining to the users of the respective client apparatuses 200 need to be updated. Therefore, during the verification session, information and indication/selection status information are basically transmit from each client apparatus 200 to the server apparatus 100 as verification input information. Based on the information, the state of the corresponding avatar in the state information is updated. Then, the server apparatus 100 transmits shared information pertaining to the update to each client apparatus 200.

When another verification input for verifying the drawing information is done, the state change unit 105 updates the state information based on information of the verification input, and the management unit 104 includes information indicating the changes that occurred in the state information in the shared information and has it transmit to each client apparatus 200.

In the embodiment, to facilitate understanding of the mechanism, an example will be explained as one aspect, in which information of a verification input to each client apparatus 200 is first transmitted to the server apparatus 100 and reflected in state information by the state change unit 105, and shared information indicating the change is transmitted to all the client apparatuses 200 connected to the verification session and is reflected in 3D spaces constructed by the construction units 204. That is, to completely synchronize the 3D spaces rendered in each client apparatus 200, all pieces of information that change the state information occurred in the verification session are once reflected in the state information managed in the server apparatus 100, and then the 3D spaces locally constructed in each client apparatus 200 is updated to synchronize with the state information. However, it is also possible that the verification input made at a given client apparatus 200 is applied to a locally constructed 3D space without intervention of shared information, and shared information pertaining to a change of state information occurred based on the verification input information is transmitted to only the remaining client apparatuses 200 except the given client apparatus 200.

<<Verification Processing>>

Figure 4:
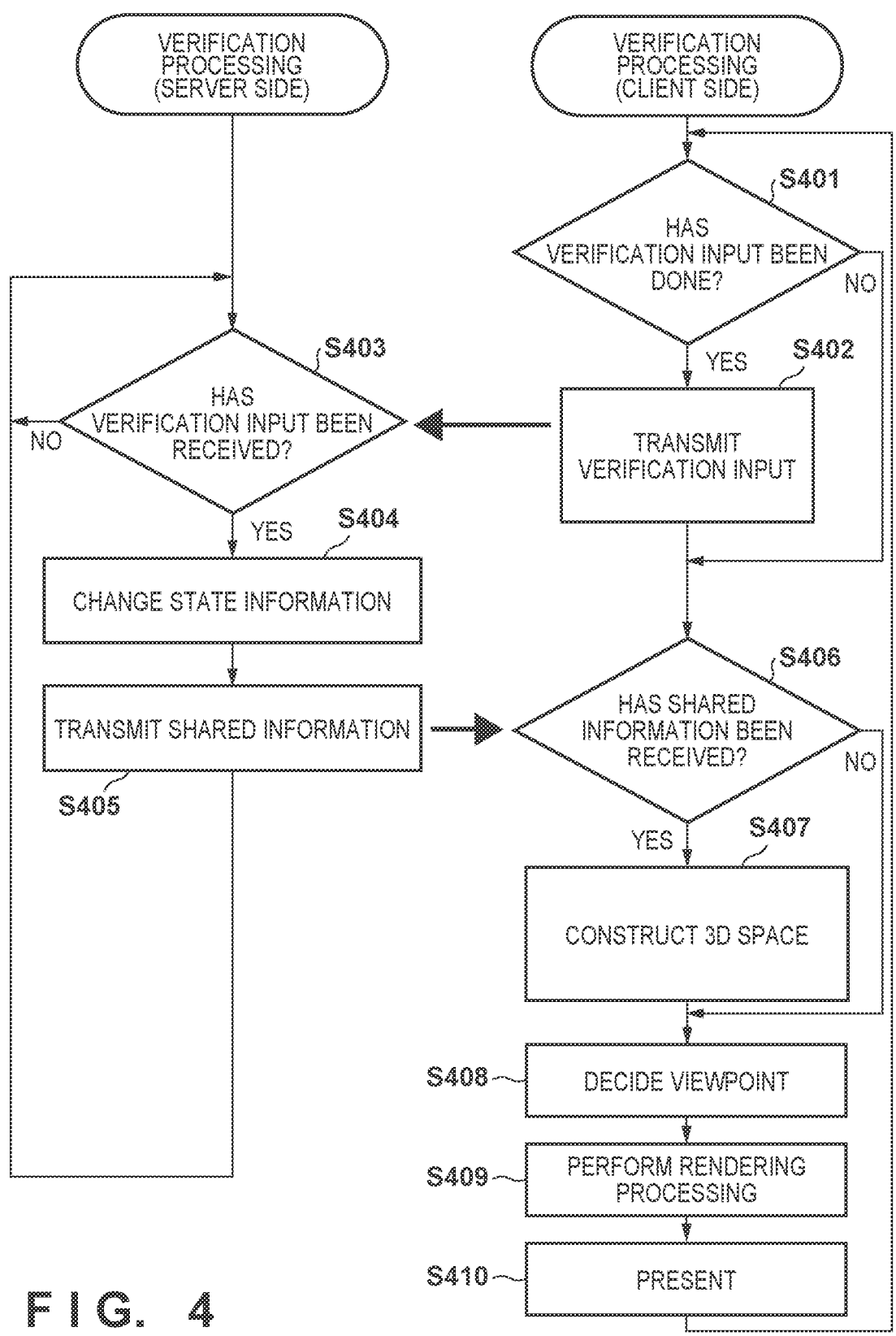
FIG. 4 is a flowchart exemplifying verification processing executed in regard to verification of drawing information in the drawing verification system according to the embodiments and modifications of the present invention.

Verification processing executed in regard to verification by the server apparatus 100 and the client apparatuses 200 connected to a verification session when the session is established in the drawing verification system according to the embodiment will be explained in detail with reference to the flowchart of FIG. 4. Processing corresponding to the flowchart can be implemented by, for example, reading out corresponding processing programs respectively stored in the server recording medium 102 and the recording medium 202 by the server control unit 101 and the control unit 201, deploying them in the server memory 103 or the memory 203, and executing them. Note that the verification processing starts when, for example, the client apparatus 200 is connected to an established verification session, a 3D space based on drawing information is constructed in the client apparatus 200, and the process proceeds to a sequence in which a view of binocular stereoscopic vision can be presented.

In step S401, the control unit 201 determines whether a verification input has been done. Whether a verification input has been done may be determined in accordance with whether an operation input for instructing a change to another object, an operation input for instructing a change of the position and posture of an object, or as for an input of discussion information, a corresponding input has been done. The verification input pertaining to viewpoint information or a status of the indication/selection for a verification target may be determined in accordance with, for example, whether an input causing a change from a state in a previous frame has been done. If the control unit 201 determines that a verification input has been done, it shifts the process to step S402. If the control unit 201 determines that no verification input has been done, it shifts the process to step S406.

In step S402, the control unit 201 transmits the verification input information to the communication unit 208 in association with identification information of the client apparatus 200, and controls the communication unit 208 to transmit the verification input information to the server apparatus 100.

In step S403, the server control unit 101 of the server apparatus 100 determines whether the server apparatus 100 has received the verification input information during a predetermined processing period such as one frame from the client apparatus 200 connected to the verification session. If the server control unit 101 determines that the verification input information has been received from one of the client apparatuses 200 during the predetermined processing period, it shifts the process to step S404. If the server control unit 101 determines that no verification input information has been received from any client apparatus 200 during the predetermined processing period, it determines that the processing on the server apparatus 100 side pertaining to this frame is completed, waits till the timing when processing pertaining to the next frame starts, and performs again the processing of this step for the next frame.

Note that state changes may compete against each other such that pieces of verification input information received from the plurality of client apparatuses 200 during a predetermined processing period have contents targeting the same object. In such a case, the server control unit 101 can control to process first received verification input information out of the pieces of verification input information received from the plurality of client apparatuses 200 during the predetermined processing period without executing processing based on the remaining received pieces of verification input information from the remaining client apparatuses 200.

In step S404, the state change unit 105 changes state information managed by the management unit 104 based on the received verification input information under the control of the server control unit 101. More specifically, the state change unit 105 changes the state of a target object in a 3D space based on the received verification input information, and changes the state information by adding, to history information, a change history based on the verification input information and the identification information associated with the verification input information.

In step S405, under the control of the server control unit 101, the management unit 104 composes shared information pertaining to the change of the state information performed in step S404 and transmits the shared information to the server communication unit 106, and the server communication unit 106 transmits it to the client apparatuses 200 connected to the verification session.

In the client apparatus 200, the control unit 201 waits till a predetermined processing timing on the assumption that the shared information will be received, and then determines, in step S406, whether the client apparatus 200 has received shared information from the server apparatus 100. If the control unit 201 determines that shared information has been received, it shifts the process to step S407. If the control unit 201 determines that no shared information has been received, it shifts the process to step S408.

In step S407, under the control of the control unit 201, the construction unit 204 constructs a 3D space in which a change based on the received shared information is added.

In step S408, under the control of the control unit 201, the decision unit 205 decides a viewpoint at which rendering pertaining to this frame is performed. In the processing of this step, if an input pertaining to a change of the viewpoint is performed, the viewpoint is decided by changing it to a state in which the input is reflected. If an input pertaining to a change of the viewpoint is not done, the decision unit 205 decides, as the viewpoint, one at which rendering pertaining to the previous frame has been performed.

In step S409, under the control of the control unit 201, the rendering unit 206 renders the constructed 3D space based on the viewpoint decided in step S408, and generates images pertaining to one frame of the view of binocular stereoscopic vision.

In step S410, the control unit 201 transmits the images generated in step S409 to the HMD 210, controls the HMD 210 to present them, and returns the process to step S401 in order to perform the processing for the next frame.

As described above, the drawing verification system according to the embodiment can preferably implement verification of drawing information through the presentation of a view of binocular stereoscopic vision in a synchronized 3D space in a verification session in which the plurality of client apparatuses 200 participate.

In the embodiment, a verification input that changes the state of a 3D space pertaining to drawing information is a change to a layout object, a change of the layout position and posture of an object, an input of discussion information, or a change of viewpoint information and a status of indication/selection. However, the practice of the present invention is not limited to this. For example, the verification input may be an operation input pertaining to selection of a verification item in a mode in which a plurality of types of verification items for performing a visual verification are provided in advance in regard to verification of drawing information. In this mode, when an operation input pertaining to selection of a verification item is done in the client apparatus 200 participating in a verification session, the state change unit 105 changes state information so as to present a view of binocular stereoscopic vision including a graphical interface for the verification item.

The verification items may include, for example, at least one of a change of an object such as a facility machine to be laid out, the layout of an object, setting (zoning) of a region where an object is laid out, confirmation of the traffic line of a product or object user based on the layout of an object, setting of the temperature condition of the operation environment of an object, the layout of an air-conditioner in an establishment, an illumination condition set at the time of operating an object, the layout of an illumination in the establishment, the maintainability of objects, a camera installation location in the establishment, and setting of the angle of view of an installed camera. For example, when a verification item pertaining to a change of an object is selected, a graphical user interface for deciding an object after change is laid out in a 3D space and presented as a view of binocular stereoscopic vision to the user of each client apparatus 200.

Second Embodiment

In the above-described first embodiment, the server apparatus 100 holds layout information out of drawing information, manages only information of a 3D space pertaining to the drawing information, and at the end of a verification session, manages history information in association with information for identifying the drawing information. However, the practice of the present invention is not limited to this.

For example, a server apparatus 100 may manage drawing information, and upon receiving verification input information or at the end of a session, update the drawing information to a state in which a change occurred in state information is reflected. That is, a change of drawing information based on a verification performed in a verification session may be reflected in the drawing information by the server control unit 101 without requiring any work by the designer as a result of the performed verification, instead of the designer working on it, for example, by referring to history information after the verification session has ended.

[First Modification]

In the mode in which drawing information is held in the server apparatus 100 and can be changed, as in the above-described second embodiment, CAD data of an installed machine or the like needs to be stored in the server apparatus 100 for the change. In other words, drawing information and 3D CAD data necessary to compose the drawing information are held in the server apparatus 100. Each client apparatus 200 need not store drawing information and hold rendering object information so that it can cope with a change of a layout object.

Thus, the client apparatus 200 may be provided with only authority information pertaining to a verification session via a recording medium including the authority information and if necessary, receive, from the server apparatus 100 via a communication unit 208, rendering object information and layout information necessary to present a view of binocular stereoscopic vision used in the verification system. In this mode, when a layout object is changed to another object, shared information may include rendering object information pertaining to the other object and be provided to the client apparatus 200.

[Second Modification]

In the mode in which drawing information is substantially editable by a verification session, like the above-described second embodiment and first modification, for example, layout information composed by combining and laying out rendering objects may be set in advance as a template for, for example, a plurality of types of objects necessary to implement a specific production function so that the objects can be laid out in verification of drawing information. The layout information can be laid out in a 3D space in a mode in which objects are replaced with others or a mode in which objects are newly laid out at the time of verification.

Such layout information may not always meet design specifications, or may not match the size of an installation region. Even after a verification input pertaining to the layout is done, an adjustment can be made, including a change of the position and posture of a rendering object pertaining to the combination or replacement of some objects. Particularly considering a mode in which variations of different scales are provided for some facility machines or the latest updated models and the like are provided, the layout information may not satisfy ever-changing needs of an orderer.

Hence, when a change of the same content is performed by more than a predetermined number of times on a rendering object laid out based on layout information pertaining to the same template, the server control unit 101 may reflect the change in the layout information so that the reflected object can be laid out in verification. When a verification session is performed for drawing information already composed using the layout information, it may be adjusted to make a proposal to change an object at the target position in the session.

OTHER EMBODIMENTS

The invention is not limited to the foregoing embodiments, and various variations/changes are possible within the spirit of the invention.

The drawing verification system according to the present invention can be implemented by a program of causing one or more computers to function as each device of the drawing verification system. The program can be provided/distributed by recording it on a computer-readable recording medium or via a telecommunication line.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A drawing verification system comprising a server apparatus that establishes a session pertaining to verification of drawing information composed based on a facility specification, and a plurality of client apparatuses that connect to the session via a network and perform information communication, wherein the verification in the session is performed by laying out rendering object information used to render an object included in the drawing information in a virtual 3D space based on layout information that corresponds to the drawing information and indicates a position and posture of the object, the server apparatus comprises:

an establishing unit configured to establish the session upon receiving a session start request from one of the plurality of client apparatuses storing the drawing information that is a verification target;

a management unit configured to manage state information indicating a state of the 3D space that is corresponding to the verification target drawing information for the session which is established by the establishing unit;

a first reception unit configured to receive information of a verification input made at each of the plurality of client apparatuses participating in the session;

a change unit configured to change the state information upon receiving the information of the verification input by the first reception unit; and a first transmission unit configured to transmit, to the client apparatuses connected to the session, shared information necessary to render the 3D space based on the state information, and each of the plurality of client apparatuses comprises:

a first recording unit;

a second reception unit configured to connect, on a condition that the verification target drawing information is stored in the first recording unit, to the session and receive the shared information transmitted by the first transmission unit;

a construction unit configured to construct at least part of the 3D space based on the shared information received by the second reception unit, the rendering object information, and the layout information;

a decision unit configured to decide a position and direction of a viewpoint at which the constructed 3D space is rendered;

an output unit configured to sequentially render and output views of binocular stereoscopic vision of the constructed 3D space rendered based on the viewpoint decided by the decision unit;

a presentation unit configured to present the views of binocular stereoscopic vision rendered and output by the output unit;

an input unit configured to accept the verification input; and a second transmission unit configured to transmit, to the server apparatus, the information of the verification input accepted by the input unit.

2. The drawing verification system according to claim 1, wherein the verification input accepted by the input unit includes at least one of a change instruction of an object laid out in the constructed 3D space, a change instruction of at least one of a position and posture of an object laid out in the 3D space, and discussion information indicating contents of a discussion conducted for verification of the drawing information, and the management unit manages, by including in the state information based on a change of the state information according to the information of the verification input by the change unit, history information indicating at least one of a change history of the object laid out in the 3D space, a change history of at least one of the position and posture of the object laid out in the 3D space, and a minute generated based on the discussion information.

3. The drawing verification system according to claim 2, wherein the second transmission unit transmits the information of the verification input in association with identification information indicating the client apparatus to which the verification input has been input, or a user of the client apparatus, and information pertaining to each verification input is associated with the identification information corresponding to the verification input in the history information.

4. The drawing verification system according to claim 1, wherein the rendering object information includes 3D model data that is for an object represented by the rendering object information and that is composed based on CAD data of the object included in the drawing information.

5. The drawing verification system according to claim 1, wherein the rendering object information is composed by including motion information that defines motions of at least some objects represented by the rendering object information.

6. The drawing verification system according to claim 1, wherein the drawing information includes at least the rendering object information and the layout information corresponding to the drawing information, and the construction unit constructs at least part of the 3D space based on the shared information, and the rendering object information and the layout information that are stored in the first recording unit.

7. The drawing verification system according to claim 6, wherein the drawing information includes authority information indicating whether to permit participation in the session, and when the drawing information including the authority information that permits participation in the session is stored in the first recording unit, each of the plurality of client apparatuses is controlled to connect to the session.

8. The drawing verification system according to claim 6, wherein the server apparatus further comprises a second recording unit configured to store the layout information corresponding to the drawing information, and the management unit manages the state of the 3D space based on the layout information stored in the second recording unit and the state information.

9. The drawing verification system according to claim 1, wherein the drawing information includes at least the rendering object information and the layout information corresponding to the drawing information, and the server apparatus further comprises:

a second recording unit configured to store the drawing information; and an update unit configured to update the drawing information stored in the second recording unit based on the information of the verification input received by the first reception unit.

10. The drawing verification system according to claim 9, wherein layout information composed of combinations and layouts of rendering object information for multiple types of objects is predefined as a template to be able to use in verification of the session, and the server apparatus further comprises an adjustment unit configured to perform, when the same changes are made by more than a predetermined number of times to layout information based on the same template in a plurality of the sessions, at least one of changing the layout information and proposing a change in a session for verifying the drawing information that adopts the layout information.

11. A client apparatus that connects and performs information communication via a network to a session, which is established by a server apparatus for verification of drawing information designed based on a facility specification and to which a plurality of client apparatuses are able to connect, wherein the verification in the session is performed by laying out rendering object information used to render an object included in the drawing information in a virtual 3D space based on layout information that corresponds to the drawing information and indicates a position and posture of the object, the client apparatus comprises:

a recording unit;

a connection unit configured to connect, on a condition that the drawing information which is a verification target is stored in the recording unit, to the session;

a reception unit configured to receive shared information necessary to render the 3D space in which verification is performed in the session;

a construction unit configured to construct at least part of the 3D space based on the shared information received by the reception unit, the rendering object information, and the layout information;

a decision unit configured to decide a position and direction of a viewpoint at which the constructed 3D space is rendered;
an output unit configured to sequentially render and output views of binocular stereoscopic vision of the constructed 3D space rendered based on the viewpoint decided by the decision unit;
a presentation unit configured to present the views of binocular stereoscopic vision rendered and output by the output unit;
an input unit configured to accept a verification input; and
a transmission unit configured to transmit information of the verification input accepted by the input unit.

12. The client apparatus according to claim 11, wherein the drawing information includes at least the rendering object information and the layout information corresponding to the drawing information, and authority information indicating whether to permit participation in the session,
the connection unit controls to connect to the session when the verification target drawing information stored in the recording unit includes the authority information that permits participation in the session, and
the construction unit constructs at least part of the 3D space based on the shared information, and the rendering object information and the layout information that are stored in the recording unit.

13. The client apparatus according to claim 11, wherein the drawing information includes a plurality of objects that are laid out at different locations in the 3D space,
the verification input includes an input that indicates a partial object among the plurality of objects,
the shared information includes information to differ a presentation mode of the partial object indicated in one of the plurality of client apparatuses, and
the transmitting unit transmits the information of the verification input in association with identification information indicating the client apparatus to which the verification input has been input, or a user of the client apparatus.

14. A non-transitory computer-readable recording medium that records a program for causing a computer to function as each unit of the client apparatus according to claim 11.

15. A server apparatus that establishes a session pertaining to verification of drawing information composed based on a facility specification and implements information communication between a plurality of client apparatuses connected to the session via a network,
wherein the verification in the session is performed by laying out rendering object information used to render an object included in the drawing information in a virtual 3D space based on layout information that corresponds to the drawing information and indicates a position and posture of the object,
the server apparatus comprises:
a management unit configured to manage state information indicating a state of the 3D space that is a verification target for the session, which is established upon receiving a session start request from one of the plurality of client apparatuses;
a reception unit configured to receive information of a verification input made at each of the plurality of client apparatuses participating in the session;
a change unit configured to change the state information upon receiving the information of the verification input by the reception unit; and
a transmission unit configured to transmit, to the client apparatuses connected to the session, shared information necessary to render the 3D space based on the state information,
wherein the verification includes at least one of a change instruction of an object laid out in the 3D space, a change instruction of at least one of a position and posture of an object laid out in the 3D space, and discussion information indicating contents of a discussion conducted for verification of the drawing information, and
the management unit manages, by including in the state information based on a change of the state information according to the information of the verification input by the change unit, history information indicating at least one of a change history of the object laid out in the 3D space, a change history of at least one of the position and posture of the object laid out in the 3D space, and a minute generated based on the discussion information.

16. A server apparatus that establishes a session pertaining to verification of drawing information composed based on a facility specification and implements information communication between a plurality of client apparatuses connected to the session via a network,
wherein the verification in the session is performed by laying out rendering object information used to render an object included in the drawing information in a virtual 3D space based on layout information that corresponds to the drawing information and indicates a position and posture of the object,
the drawing information includes at least the rendering object information and the layout information corresponding to the drawing information, and
the server apparatus comprises:
a management unit configured to manage state information indicating a state of the 3D space that is a verification target for the session, which is established upon receiving a session start request from one of the plurality of client apparatuses;
a reception unit configured to receive information of a verification input made at each of the plurality of client apparatuses participating in the session;
a change unit configured to change the state information upon receiving the information of the verification input by the reception unit;
a transmission unit configured to transmit, to the client apparatuses connected to the session, shared information necessary to render the 3D space based on the state information;
an update unit configured to update the drawing information based on the information of the verification input received by the reception unit; and
an adjustment unit configured to perform, when the same changes for the same object are made by more than a predetermined number of times, at least one of changing the layout information and proposing a change in a session for verifying the drawing information that adopts the layout information.

17. The server apparatus according to claim 16, further comprising a recording unit configured to store the drawing information, and
wherein the update unit updates the drawing information stored in the recording unit.

* * * * *